Oct. 14, 1930.   H. A. W. WOOD   1,778,477
MULTIPLE SHEAR PIN
Filed Nov. 23, 1928
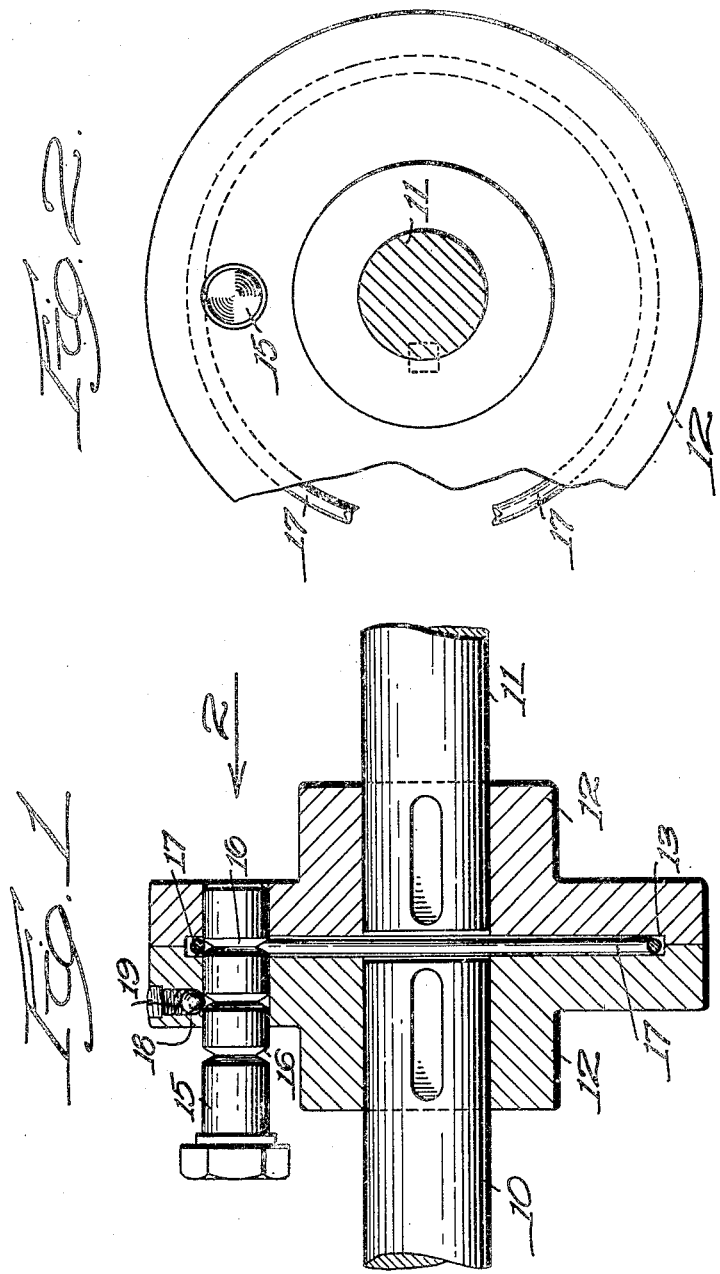

Patented Oct. 14, 1930

1,778,477

UNITED STATES PATENT OFFICE

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

MULTIPLE SHEAR PIN

Application filed November 23, 1928. Serial No. 321,385.

This invention relates to shear pins for any kind of machinery, such pins being adapted to connect two elements, as for example, two rotating shafts, to shear or break when any undue strain is encountered, thus locating the break at a predetermined point and prevent the breaking of other parts of the machine. The shear pin ordinarily after being broken, of course, is taken out and replaced at a small expense, but sometimes this requires an appreciable amount of time.

This invention relates to a shear pin which is adapted to be broken in a plurality of places at successive times and to be replaced merely by forcing it along longitudinally until a second groove or weak spot comes in the plane or division between the two elements which it connects.

Reference is to be had to the accompanying drawings in which

Fig. 1 is a longitudinal sectional view of two shafts connected by a shear pin, constructed in accordance with this invention, and Fig. 2 is an end view.

I have shown the invention as applied for connecting two shafts 10 and 11. Each shaft has a head 12. These heads abut against each other but have a space or recess 13 between them inside. They are bored at one point and a shear pin 15 introduced so that the power for driving one shaft by the other will all be transmitted through this shear pin.

This pin is provided with a plurality of circumferential grooves 16 or otherwise weakened in a plurality of planes. It is shown in its original position.

The pin is provided with a holder 17 in the space 13 which consists of a ring resting in one groove 16 and preventing the displacement of the pin.

I have also shown a ball 18 and spring 19 arrangement engaging another groove and performing two functions. It assists in holding the pin in position ordinarily and in fact, it can be substituted for the holder 17 for that purpose and that can be omitted, but, of course, it is not a positive means for holding it. It also serves to hold the pin in place after it has been broken at the groove 16.

In the use of the device the pin, being placed in the position shown, will be broken if enough resistance is encountered. This break occurs in the first groove 16, the one that is located in the recess 13. This, as in other shear pins, ensures that the breakage will occur here where it can be repaired in a very simple manner instead of in some other point in the machine and thus it protects the rest of the machine.

After the breakage occurs, the two shafts are brought around together so that the two holes through them register and then the pin 15 is forced in until the second groove 16 comes in the recess 13. At this time the holder 17 enters this groove and tends to hold the pin in position and the ball 18 will enter the next groove if there is another.

The pin can be pushed in easily because neither of the holding means is positive. The unused part of the pin will be prevented from falling out by the spring and ball construction when the pin is broken at another point.

This constitutes a very simple means for providing for the renewal of the connection and avoids the necessity of removing a part of the pin from each of the two heads 12, which sometimes causes some trouble and delay.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:—

1. The combination with a pair of movable elements having registering perforations therethrough, of a shear pin located in said perforations and having a weakened area located at the plane of division between the two elements, said shear pin having a second weakened area located within the body of one of said elements and yielding means engaging the second groove for holding the pin in place after the end is broken.

2. The combination with two movable elements each having a perforation, of a shear pin extending through both perforations and having a series of circumferential grooves spaced apart, any one of which can be located at the line of division between the two elements, and a holding means located between said two elements for engaging in the groove which is in position to be broken.

3. The combination with two movable elements each having a perforation, of a shear pin extending through both perforations and having a series of circumferential grooves spaced apart, any one of which can be located at the line of division between the two elements, a holding ring located between said two elements for engaging in the groove which is in position to be broken and a ball and spring located in one of said elements and engaging another groove in the pin to help hold the pin in position to perform its function and to hold the pin in place when the end is broken off.

4. The combination with two movable elements each having a perforation, of a shear pin extending through both perforations and having a series of circumferential grooves spaced apart, any one of which can be located at the line of division between the two elements, and a ball and spring located in one of said elements and engaging another groove in the pin to hold the pin in position to perform its function and to hold the pin in place when the end is broken off.

In testimony whereof I have hereunto affixed my signature.

HENRY A. WISE WOOD.